United States Patent [19]

Engdahl et al.

[11] Patent Number: 4,780,869

[45] Date of Patent: Oct. 25, 1988

[54] LOCAL AREA NETWORK REDUNDANCY SYSTEM

[75] Inventors: Jonathan Engdahl, Saline; Lawrence Esker, Ann Arbor; Thomas J. Bray; Jeffery A. Hanneman, both of Saline, all of Mich.

[73] Assignee: Allen-Bradley Company, Inc., Milwaukee, Wis.

[21] Appl. No.: 52,707

[22] Filed: May 20, 1987

[51] Int. Cl.[4] ............................. H04J 1/16; H04J 3/14
[52] U.S. Cl. ...................................................... 370/16
[58] Field of Search ....................... 370/16, 13, 88, 85; 340/825.05

[56] References Cited

U.S. PATENT DOCUMENTS

| | | | |
|---|---|---|---|
| 3,162,827 | 12/1964 | Border et al. | 333/2 |
| 3,275,749 | 9/1966 | Kunihiro et al. | 179/15 |
| 4,042,780 | 8/1977 | Wolters | 370/88 |
| 4,075,440 | 2/1978 | Laubengayer | 179/175.3 S |
| 4,159,470 | 6/1979 | Strojny et al. | 340/825.05 |
| 4,245,344 | 1/1981 | Richter | 371/68 |
| 4,380,061 | 4/1983 | Mori et al. | 370/16 |
| 4,527,270 | 7/1985 | Sweeton | 371/11 |
| 4,575,842 | 3/1986 | Katz et al. | 370/16 |
| 4,658,396 | 4/1987 | Barden | 370/16 |
| 4,663,768 | 5/1987 | Ryu | 371/68 |
| 4,692,918 | 9/1987 | Elliot et al. | 370/85 |
| 4,747,115 | 5/1988 | Nambu | 375/100 |

Primary Examiner—Douglas W. Olms
Assistant Examiner—Wellington Chin
Attorney, Agent, or Firm—Quarles & Brady

[57] ABSTRACT

A redundant local area network uses two cables over which duplicate information is transmitted in parallel in the form of identical message frames. Each receiver on the network includes a circuit which evaluates the signals from the two cables and selects one of the signals to be processed. This circuit determines the length of the message frames received on each cable for a given transmission and indicates which cable, if any, carried the longer frame. The signal from the cable that carried the longer frame is then selected as the output of the receiver. Additional circuitry is provided to prevent two short frames on one cable from being considered as one long frame. An apparatus is provided to look at the historical reliability of the signals on the cables so that if one cable has had a significantly better performance than the other, a single poor transmission on the one cable will not cause the historically poorer cable to be selected until such time as the poorer cable has redeemed itself.

21 Claims, 5 Drawing Sheets

LOCAL AREA NETWORK REDUNDANCY SYSTEM

BACKGROUND OF THE INVENTION

The field of the invention is industrial control systems such as process controls, numerical controls, and programmable controllers, and particularly, to redundant local area networks for connecting such controls together.

Local area networks are comprised of two or more nodes, or stations, which are linked together by a communications media. The communication media may take a number of forms, including coaxial cable, fiber optics or twisted wire pairs. The topology of the links between stations may also take a number of forms, including star, multidrop or ring configurations.

Regardless of the media used or the topology of the network, a control scheme is required to provide an orderly transfer of information from one station to another on the network. The most primitive schemes employ a master station which is responsible for controlling the operation of the network. The master may "poll" each slave station on the network for information to be delivered to other stations, or it may enable a polled station to transmit its message directly to other stations. Such networks are not appropriate for industrial applications because the entire network is brought down if a malfunction should occur in the master station.

Another solution is to employ a carrier sense multiple access (CSMA) scheme such as that defined by the Ethernet standards. In CSMA networks each station waits for the network to go silent, and if it has a message to send, it takes control of the network and begins transmission. A mechanism must be provided to detect "collisions" when two or more stations transmit messages at the same time, and for contending with those stations to determine which has priority. While CSMA networks are appropriate for office and commercial applications, they are not appropriate for industrial networks which convey information required by "real time" control systems. Other, more "deterministic" network control schemes are required for industrial networks.

Other, more deterministic network control schemes include time slot reservation, slotted rings, register insertion rings and token passing networks. With a token passing scheme, a token in the form of a distinctive bit pattern is passed between stations on the network. While a station has the token it can transmit messages to other stations or command other stations to transmit messages. While token passing schemes are simple in concept, they are complicated to implement due to the problem of lost tokens and duplicate tokens. These problems are more severe in the industrial environment where power may be lost, where stations may be added or removed from the network, or where malfunctions may occur in a station or the media connecting the stations. U.S. patent application Ser. No. 771,834 filed on Sept. 3, 1985, and assigned to same assignee as the present application, teaches one type of a token passing network wherein each node of the network assumes control of the maintenance of the network while it possesses the network master token.

Several problems are encountered with local area networks of whichever type when they are used to control various pieces of production equipment on an assembly line. One problem is that the various manufacturing processes, such as electric welding, may induce noise into the electrical cable for the network. This noise may be erroneously interpreted as a valid message or may garble messages. Another problem may be the physical interruption of the cable by accidental severing or by the malfunction of a piece of equipment that is connected to the network. In order to overcome these problems, various types of survivable communication systems have been devised. One such example is shown in U.S. Pat. No. 4,575,842 issued on Mar. 11, 1986 to Joseph L. Katz, et al. This network utilizes a number of separate cables so that when a fault is encountered in one of the cables that one may be isolated and another cable used in its place. The signal is typically transmitted over only one cable and various devices on the network switch the signal between various cables in order to patch around a faulty segment.

Another redundancy technique that was considered by the present inventors is the use of two separate communication media and transmitting each message over both media. Each station then receives both messages and decodes them. The received data from each media is checked using a frame check sequence that is part of the message. The more reliable data is then ueed by the station. This technique, although relatively simple to implement requires two complete data receivers to convert both encoded network transmissions into the digital information. This significantly increases the cost of each station.

SUMMARY OF THE INVENTION

A communication system provides redundancy by connecting each station on the system to two parallel communication media. When one station sends a message to another station the message is transmitted over both media simultaneously. The message consists of a series of frames of information and includes the address of the station to which the message is directed.

Each station monitors both media for message frames. Receivers at each station determine whether a frame of information has been received on both media for a given transmission and if so whether one frame is longer than the other. In the event that a message frame is received on only one medium for a given transmission, the system indicates whether this frame lasted for at least a predetermined length of time.

Apparatus is provided for selecting one of the media based on which media had the longer message frame which lasted for at least the predetermined length of time. This apparatus then connects the selected medium to additional circuitry for processing the received message. Optionally, equipment may be included to detect errors that cause the less reliable medium to appear to have the longer message frame.

An aspect of the present invention is to provide a network station that monitors the signals over several redundant communication media and selects the most reliable medium from which to receive messages. Another object of the invention is to accomplish this selection without having to fully decode the signals on all of the media.

DETAILED DESCRIPTION OF THE INVENTION

A station on a communication network typically consists of a physical interface, a media access controller, and the computer or other device which communicates over the network. The physical interface connects the station to the communication network medium. The function of the physical interface is to encode the data into a signal having the proper electrical characteristics for transmission over the network and decode the signals received from other stations. The media access controller interfaces the parallel data format of the computer to the serial format of the network. This controller also adds other components to the data transmission which aid in error detection and message identification. In some systems, the physical interface is included as part of the media access controller but, for the purposes herein, they will be considered separate units.

Figure 1:
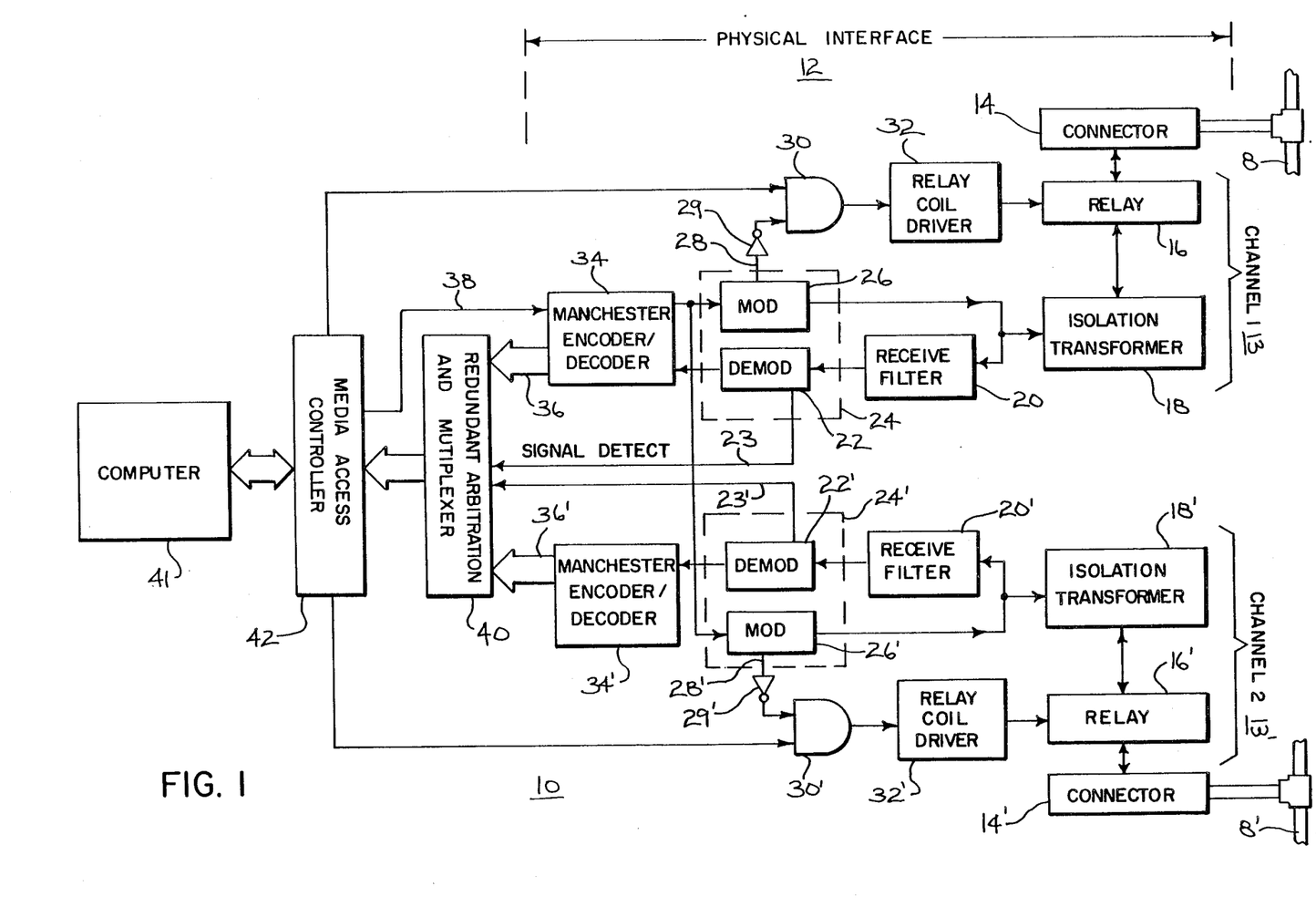
FIG. 1 is a block schematic diagram of the front end of a redundant communication network station receiver according to the present invention.

As shown in FIG. 1, a communication network transmiter/receiver generally designated 10 has a physical interface 12 which is used to connect the transmitter/receiver to two communication media, such as network cables 8 and 8'. Although the present invention is described in conjunction with data cables, other communication media may be used. The physical interface 12 consists of two identical channels 13 and 13' each of which is connected to a separate cable 8 and 8', respectively. Identical data is sent simultaneously over both cables and the receiving station selects one of the cable's signal to decode based on which cable is more reliable at that time.

One channel 13 will be described in detail with the corresponding components of the other channel 13' being designated on FIG. 11 by the primed reference numerals. A connector 14 couples the electrical circuitry to one of the cables 8. A disconnect relay 16 couples the connector 14 to one winding of an isolation transformer 18. The other winding of the transformer 18 is connected directly to the output of a modulator 26 within a modem 24. The modulator 26 transmits serial digital data as a periodic high frequency, asynchronous signal whose precise frequency depends on whether the serial digital data is a logic high or low level. For example, the modulator 26 generates a 6.25 MHz signal for a level logic high and a 3.75 MHz signal for a logic low level. The modulator 26 also provides an indication when its transmission has exceeded a certain length of time. That excessive transmission is indicated by a high level on an output line 28 which is coupled via an inverter 29 to one input of an dual input AND gate 30. The other input to AND gate 30 comes from a media access controller 42. The output of the AND gate 30 controls a relay driver 32 which provides a signal to the coil of the disconnect relay 16. Under normal circumstances, both inputs to the AND gate 30 are high which causes relay 16 to couple the corresponding cable 8 to the station.

The other winding of the transformer 18 also is connected to a receive filter 20 which passes only a frequency bandwidth that contains the data signals transmitted on the cable. For example, the receive filter 20 for the above modulator frequencies has a bandwidth in the 3 to 7 MHz range. The output of the receive filter 20 is connected to the input of a demodulator 22 which is part of modem 24. The demodulator 22 converts the high frequency signals received from the cable 8 into a baseband data signal. In addition to producing a demodulated data output signal, each demodulator 22 and 22' produces a signal indicating that it has received a signal to demodulate. The received signal indication from modem 24 is fed via line 23 to a redundant arbitration and multiplexer circuit 40. The modem 24 may comprise high speed FSK modem circuits, such as NE 5080 and NE 5081 manufactured by Signetics, Inc.

The modem 24 is connected to a Manchester encoder/decoder circuit 34 which translates the digital data to be sent on the cable into a Manchester code format and carries out the reverse translation on data received from the cable. The Manchester encoder/decoders may comprise any of several well known commercially available devices, such as part number HD-6409 manufactured by Harris Corp. During data transmission, Manchester encoder/decoder circuit 34 receives standard serial data on line 38 from a media access controller 42 and encodes the data into the Manchester format. The encoded serial output 27 of the Manchester circuit 34 in channel 1, carrying the data to be transmitted simultaneously over both cables 8 and 8', is coupled to the modulators 26 and 26' for both channels. The Manchester encoder portion of circuit 34' in channel 2 is not utilized. During data reception, the Manchester encoder/decoder 34 receives a demodulated Manchester format encoded signal from modem demodulator 22 and converts it into a standard serial bit stream on a line of connection 36.

Each of the connections 36 and 36' between the Manchester encoder/decoder circuit 34 and the redundant arbitration and multiplexer circuit 40 actually consists of lines carrying three different signals. The first connection contains a non-valid Manchester (NVM) signal which is at a low level upon the receipt of a valid Manchester encoded preamble and remains at that low level until the end of the message frame. Another signal via connection 36 is the clock information recovered from the received Manchester signal and the final signal is the actual data from the decoding process. The arbitration and multiplexer circuit 40 also receives the output from the signal detector via line 23.

With continuing reference to FIG. 1, the function of the arbitration and multiplexer circuit 40 is to evaluate the input data from both channels 13 and 13' and determine which of the first or second cables, 8 or 8', has a more reliable signal. This determination process will be described in detail subsequently. Based on this evaluation, data from the more reliable cable is sent to the received data input of the conventional media access controller (MAC) 42.

Figure 2:
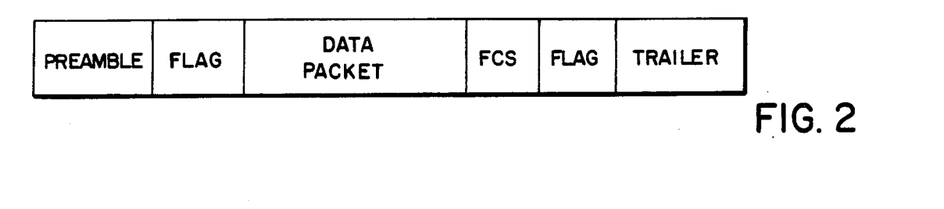
FIG. 2 is a diagram of a message frame received by the present receiver.

The media access controller (MAC) 42 interfaces the physical interface 12 to a data ultilization device such as computer 41. The MAC 42 may incorporate any one of several commercially available protocol communication controllers, such as an R68560 or R68561 device manufactured by Rockwell International. The MAC 42 formulates the data to be transmitted into a message frame and disassembles the received message frames to recover the data. A given transmission consists of the same message frame being sent over each cable. A complete message frame, as shown in FIG. 2, begins with a leader of a non-data carrier signal followed by a unique series of preamble bits which identify the message as being a validly encoded Manchester format message. Following the preamble bits are a first set of flag bits followed by a packet containing the data being exchanged between network stations. Frame check sequence (FCS) bits follow the data packet and are succeeded by another set of flag bits and a trailer of a non-data carrier signal which indicate the end of the message. A typical message frame may be 90 microseconds to 2.7 milliseconds long depending upon the amount of data in the data packet field.

When data is being transmitted the MAC 42 of the transmitting station adds the leader, preamble, flag, FCS and trailer fields to form the message frame. The receiving station's MAC 42 takes the received message frame from the network 8 and strips off these same fields to obtain the data packet. The FCS field is used in the receiving station's MAC to check the accuracy of the data transmission. The MAC 42 also provides conversion between the parallel data in the computer and the serial form data on the network.

Figure 3:
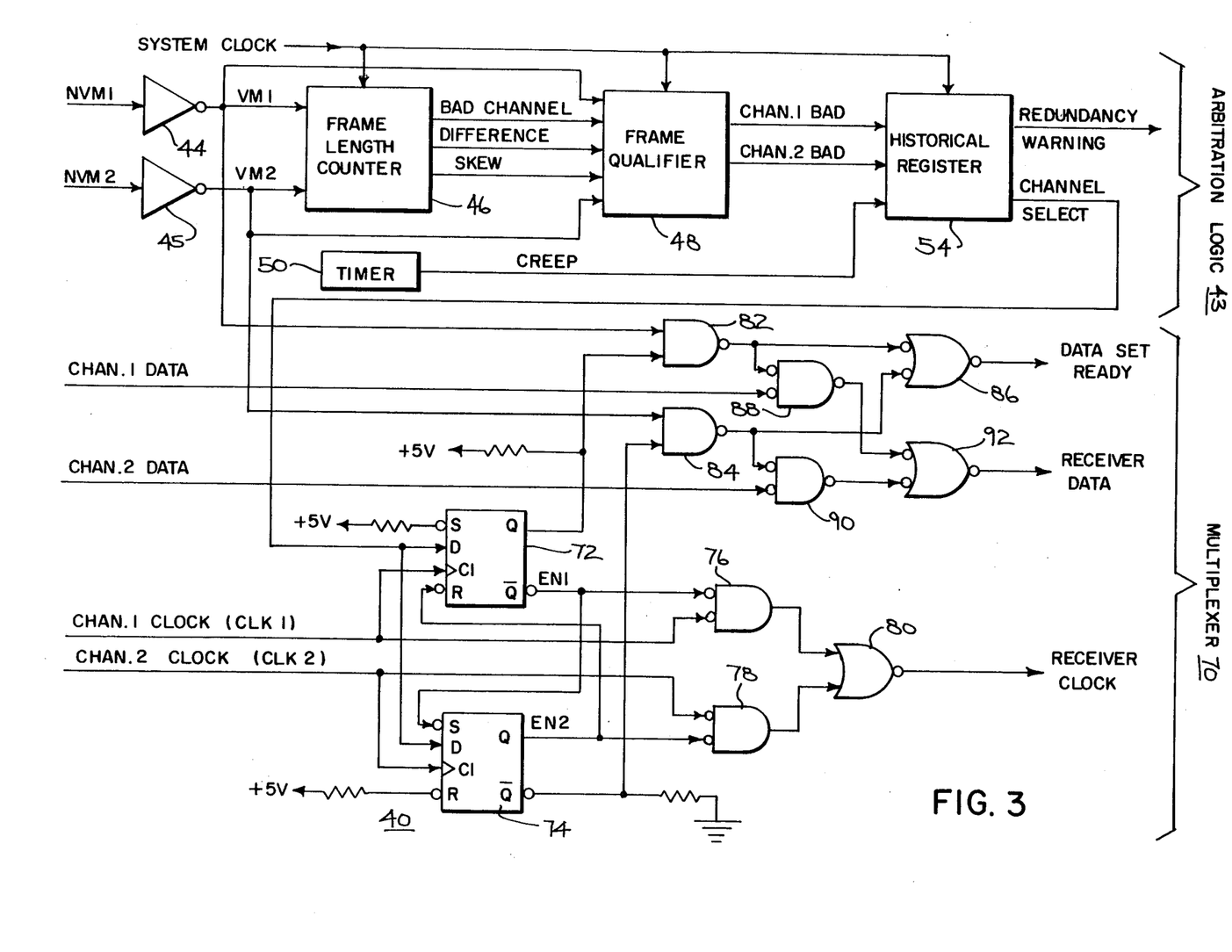
FIG. 3' is a schematic diagram of the bus arbitration and multiplexer circuitry for the receiver.

As noted above, the arbitration and multiplexer circuit determines which of the channels 13 or 13' to connect to the MAC 42 based on the channel having the more reliable signal. The details of the redundant arbitration and multiplexer circuit 40 are shown in FIG. 3 and consist of arbitration logic section 43 and a multiplexer portion 70. The arbitration logic section has three major components: a frame length counter 46, a frame qualifier 48, and a historical register 54. Each of these components preferably consists of a state machine which may be configured on a National Semiconductor Corporation 16R6 or 20×8 logic gate array using conventional techniques. As an alternative to state machines, shift register or bidirectional counter circuits can be employed in these elements. Therefore, for ease of description, the function of the frame length counter 46 and the historical register 54 will be described herein in terms of shift register type counters.

Figure 5:
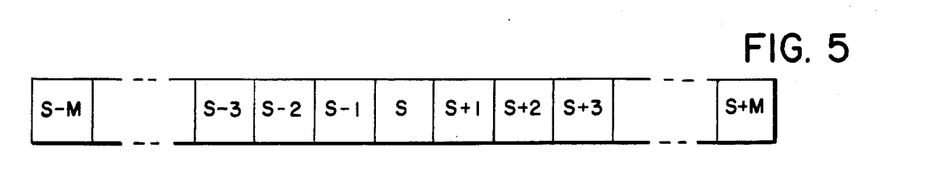
FIG. 5 is a schematic representation of a message frame length counter shown in FIG. 3.

The two non-valid Manchester signals (NVM) from the Manchester encoder/decoders 34 and 34' in the first and second channels are synchronized to the system clock via two flip-flops 44 and 45. The outputs of the two flip-flops 43 and 45 are coupled to inputs of a frame length counter 46 and a frame qualifier 48. The frame length counter 46 may be schematically represented by a bi-directional shift register having a number of stages, such as shown in FIG. 5, wherein a high level count bit is preloaded into the S register and then shifted from one stage to the next to indicate the count. The frame length counter 46 has 255 registers so that M equals 127. The presence or absence of a valid Manchester signal (VM1 or MV2) at the inputs to the frame length counter 46 determines whether or not the count is incremented or decremented. Specifically, the count may be incremented (i.e., the count bit is shifted right) if a valid signal is present on the first cable 8 but not present on the second cable 8'. This is indicated by a high level VM1 signal on the output from the first flip-flop 44 but a low VM2 signal n the output from the second flip-flop 45. The count may be decremented (i.e., the count bit shifted left) if a valid Manchester signal is present only on the second cable 8' as indicated by a high VM2 signal and a low VM1 signal. If there is a valid Manchester signal on both cables as indicated by high level VM1 and VM2 signals, the count bit remains held. Should the count bit progress to one of the end registers, S+M or S−M, it will be held there until the counter is reset. When there is no longer a valid Manchester signal from either cable, the register contents are read out and the counter is reset.

Figure 4A:
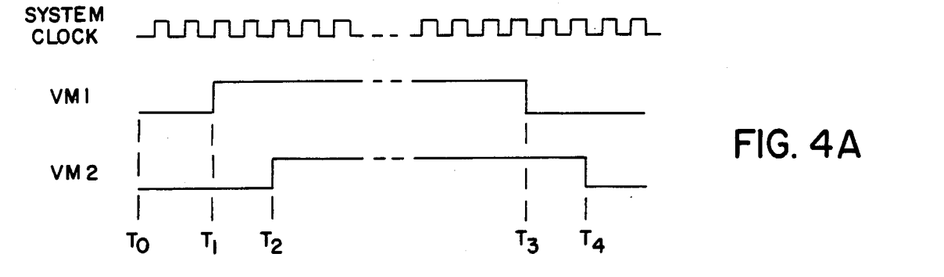
FIGS. 4A, B and C are timing diagrams for different signals received on the two network cables connected to receiver in FIG. 1.

The operation of the frame length counter 46 is best understood with reference to the various timing diagrams shown in FIG. 4. With initial reference to FIG. 4A at time T0 the frame length counter 46 has been reset so that the count bit is positioned in register S in the center of the counter. At time T1 the valid Manchester signal VM1 for the first cable goes high and the valid Manchester signal VM2 for the second cable remains low. This causes the frame length counter 46 to begin incrementing one register stage for each cycle of the system clock, since the valid Manchester signal is present only for the first cable. At tie T2 the valid Manchester signal VM2 for the second cable 8' goes high. The lag in time from T1 to T2 may be due to a difference in the physical lengths of the two cables causing a slight propagation delay in the signal on cable 8'. In this example, the length of this delay is two clock pulses so at time T2 the count bit in counter 46 will be in the S+2 register. Both of the valid Manchester signals are high from the period T2 to T3. The value of counter 46 is held and does not increment or decrement during this period. At time T3 the VM1 signal goes low and the VM2 signal remains high causing the count to decrement one register for each cycle of the system clock. The time from T3 to T4 is two clock cycles long causing the frame length counter 46 to decrement two stages returning count bit to the S register. As the lengths of the two valid Manchester signals are equal, the counter 46 at time T4, has the count bit in the S register which indicates that the received message frames were equal in length.

Figure 4B:
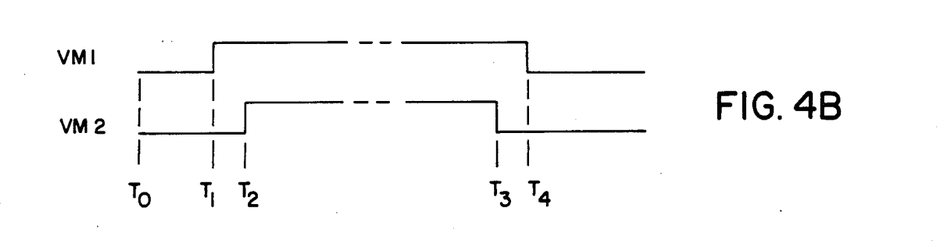

FIG. 4B shows a similar set of valid Manchester signals, however, the length of the VM2 signal from the second cable 8' is shorter than the signal VM1 from the first cable 8. At time T1 the frame length counter 46 begins incrementing from the central register S. After one clock cycle at time T2, the count bit will be in the S+1 register and the counter will hold it there because both valid Manchester signals will be high from time T2 to T3. At time T3 the VM2 signal goes to its low level and for one clock cycle, between times T3 and T4, only the VM1 signal is at a high level. During this period the counter 46 will increment one stage caused by one cycle of the system clock. Therefore, at time T4 the count bit will be in the S+2 register. At this point in time, both of the valid Manchester signals are at their low level which will reset the frame length counter 46. However, just prior to the resetting of the counter 46, an output signal is sent on the bad channel line which indicates that the final location of the count bit was on the positive side of the central register S. This signal thereby designates that the message frame on the first cable 8 was longer than the message on the second cable 8'. This designation is represented by a high logic level on the bad channel line from frame length counter 46 to the frame qualifier 48. Had the message on the second cable 8' been longer than that on the first cable 8, the final register location of the count bit would be on the decremented side of the central register S and the bad channel signal would be a low logic level. It is assumed that the longer message frame is the better of the two and that the cable with the longer frame should be connected to the MAC 42.

Although two received message frames in channels 13 and 13' have the same length, one may be indicated as being longer than the other as a result of sampling errors. Therefore, in the preferred embodiment, if the difference in message frame lengths is less than a given amount they will be considered as though they were of equal length and no presumption that the longer one was more accurate will be made. Exceeding this amount is indicated by an active difference signal being sent from frame length counter 46 to the frame qualifier 48. For example, if the difference in frame lengths is greater than eight clock cycles (about 1.6 microseconds) a high difference signal will be sent. As will be described later, unless the difference signal is active, the frame qualifier 48 will ignore the bad channel indication signal from the frame length counter 46.

There may also be an instance where one of the network cables 8 or 8' is physically severed so that no valid signal is received. In this situation, only one of the valid Manchester signals will go positive and the other will remain at the low logic level. In this situation there is a valid signal being received on one of the cables, however, a signal appearing in only one of the channels may also result from noise on its cable. It is conceivable that random noise could generate a pattern identical to a Manchester format signal which when interpreted by the Manchester encoder/decorder 34 produces a valid Manchester signal for that receiver channel. In this event, there would be a valid Manchester signal VM1 or VM2 from one of the channels which could be misinterpreted as an indication that its cable carried the better signal.

To avoid this situation, the frame length counter 46 also produces a skew signal which is derived from the time interval between the start of one valid Manchester signal to the start of the other one. When the period of time between the starting of the two signals reaches a certain value, for example 25 microseconds, the skew signal goes active. In the situation where only one of the valid Manchester signals goes high and the other does not, the one going high must remain high for an interval at least as long as the skew timing period, in order for an active skew signal to be generated. This period is selected to be long enough that it is unlikely that noise could generate a valid Manchester signal for the entire period. An interval as short as eight microseconds has been found to produce reliable results, however, the longer the skew timing period the more reliable the output will be. The skew timing period should also be selected to be longer than the maximum difference in propagation delay for the two cables at any station on the network. Therefore, it will be unlikely that valid signals on the two cables will be separated by a longer interval than the skew period.

As noted above the longer of the two signals typically is the better one. However, if only the skew and bad channel signals are used to determine which channel to use, it is conceivable that noise on the cable having the shorter valid Manchester encoded signal could be misinterpreted by the message frame length counter 46 as a longer valid signal. That is, a short frame of valid Manchester encoded data could be quickly followed by a frame caused by noise. This results in two short Manchester frame pulses appearing on the medium during a single frame period, as shown in the upper wavefrom of FIG. 4C. In this situation, the VM1 signal is active for a period from time T1 to time T2 at which point the valid message pulse 50 terminates. At time T3 noise on the line is misinterpreted as indicating another valid Manchester message from time T3 to time T5. In this case, because the gap between the two pulses 50 and 52 of the VM1 waveform occurs while the second channel has a valid Manchester signal, the frame length counter 46 will continue to increment during the noise pulse 52. The combined length of the valid pulse 50 and the noise pulse 52 is longer than that of the VM2 signal for the other cable. Therefore, even though the second cable 8' had the longer message frame, the addition of the noise pulse on the first cable produces an erroneous length determination by the frame length counter 46.

The bad channel, difference and skew signals from the message frame length counter 46 are fed to a message frame qualifier 48, along with the two valid Manchester signals VM1 and VM2, from flip-flops 44 and 45. The message frame qualifier 48 detects the occurrence of a double frame pulse and prevents the erroneous selection of the less reliable cable. The qualifier looks at the valid Manchester signals and the outputs from the length counter 46 to determine whether or not valid data is present on one or both of the cables. If valid Manchester data has been received on both of the cables or if it was received on only one of the cables for a period of time longer than the skew interval such that the skew signal became active, then the length information on the bad channel line is considered a valid indicator of the reliability of each of the cables.

The frame qualifier 48 is a state machine in which the valid Manchester signals for the two channels 13 and 13' and the skew signal are used to step the qualifier from one state to the next. The state at which the frame qualifier 48 is in when both valid Manchester signals become inactive is employed to indicate the relative quality of the signals from the two channels as will be described in detail. The message frame qualifier 48 may be configured on a 16R6 Programmable Logic Array (PLA) manufactured by Monolithic Memories, Inc. or National Semiconductor Corp. Commercially available software is employed to configure the PLA using a standard state diagram of its intended operation and additional functional information. Examples of such programs are "ABLE" licensed by Data I/O, Corp. or "PALASM" licensed by and a trademark of Monolithic Memories, Inc.

Figure 6:
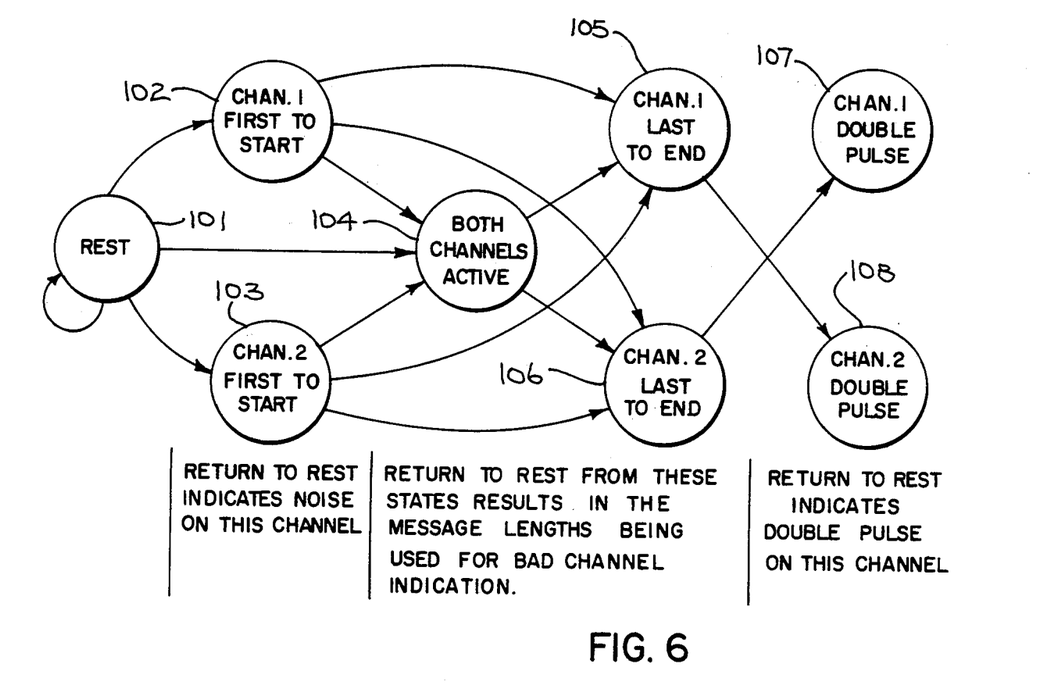
FIG. 6 is a state diagram for the message frame qualifier in FIG. 3.

In FIG. 6 each state of the message frame qualifier 48 is represented by a bubble 101–108. Transitions from one state to another are indicated by the arrows which point from the original state to the next state. When both of the valid Manchester signals VM1 and VM2 go inactive a transition occurs from whichever state is then active back to the rest state 101. Because this transition can occur from any of the active states 102–108, showing the arrows indicating all these transitions back to the rest state 101 would overly complicate the state diagram in FIG. 6. Therefore, these transitions to the rest state 101 have been omitted but, it is understood that such transitions can occur from any of the active states 102–108 to the rest state 101.

Figure 4C:
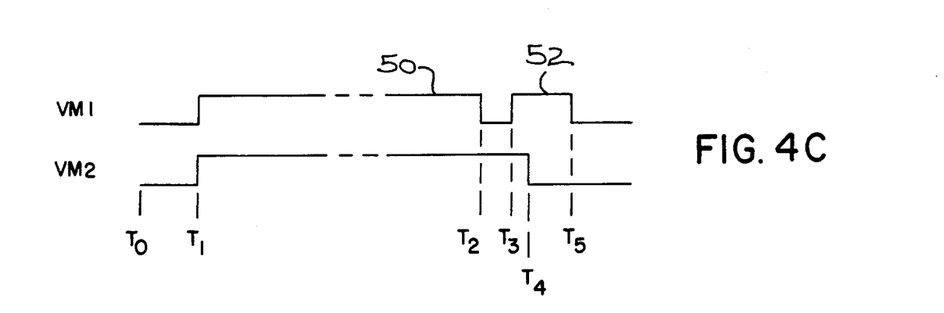

Prior to either of the valid Manchester signals (VM1 or VM2) going active, the qualifier 48 is in the rest state 101 and remains there until one or both of the valid Manchester signals goes active. If VM1 is the first to go active, as is shown in FIG. 4A, a transition occurs from the rest state 101 to the channel 1 first to start state 102. Similarly, if the valid Manchester signal occurrs first in the second channel (VM2), a transition occurres to state 103. If both of the valid Manchester signals go active simultaneously, as shown in FIG. 4C, a transition occurs from the rest state 101 to the both channels active state 104. If after one of the valid Manchester signals goes active the other one goes active, a transition occurs from either state 102 or 103, depending upon which valid Manchester signal became active first, to the both channels active state 104.

If only one of the valid Manchester signals goes active and does not remain active for the skew period i.e. 25 microseconds, the skew signal will not be active. Therefore, when the valid Manchester signal disappears, a transition will occur from either state 102 to 103 back to the rest state 101. This situation indicates that noise on one of the channels was erroneously detected as a valid Manchester signal and that the corresponding channel was bad. Therefore, a bad channel indication is sent from the qualifier 48 to the historical register 54 upon this return to rest transition. Specifically, if the return to the rest state 101 occurs from state 102 a bad first channel indication is sent and if the return to rest occurs from state 103 a bad second channel signal is transmitted.

If only one valid Manchester signal goes active and remains active for the 25 microsecond skew period, a transition occurs from the state 102 or 103 horizontally to either state 105 or 106 which indicates that this channel was the last to end. For example, if the VM1 signal became active for 25 microseconds or more and VM2 never became active, a transition from state 102 to state 105 would occur upon the receipt of an active skew signal. States 105 and 106 indicate that either the first or second cable carried the last signal to return to an inactive level.

It may be noted that a positive skew signal is not required for a transition from state 102 or 103 to state 104 which indicates that both channels are active, as it is presumed that if both channels are active their activity is not a result of noise. This assumes that it is highly improbable that a noise induced signal in cables 8 and 8' would produce a valid Manchester indication on both of them.

Message frame qualifier 48 will be in the both channels active state 104 when both VM1 and VM2 signals go inactive simultaneously. It is also conceivable that one valid Manchester signal may be active and as it goes inactive the other valid Manchester signal simultaneously becomes active, thereby becoming the last one to end. Both channels were never active at the same time. This is indicated by the transitions from state 102 to 106 in the situation where VM1 goes active first and then VM2, or the transition from state 103 to state 105 where VM2 is the first to go active and VM1 is the last to end.

If both valid Manchester signals go inactive when the message qualifier 48 is in one of the middle states 104–106 and the difference signal is active, the return to rest from these states causes the results of the message frame length counter 46 to be used for determining which of the two channels is more reliable. Specifically, a transition to rest from these states 104–106 causes the channel having the longer message length to be considered the better of the two channels if the difference signal from the frame length counter 46 indicates that the signal length difference exceeds eight clock cycles. In the case of the transition from a middle state 104–106 to the rest state 101, the bad channel signal from the message length counter 46 is used by the message qualifier 48 to determine the bad channel signal to be sent to the historical register 54. If the difference signal is inactive, perhaps because the VM1 and VM2 pulses were of equal length, neither channel is presumed to have a better signal and a bad channel indication is not sent to historical register 54. Therefore a change in the connection of the cable to the MAC 42 will not occur.

As noted above, a double valid Manchester pulse can occur which could produce an indication that the less reliable signal has the longer frame length. Therefore, an indication must be given of the occurrence of a double frame pulse so that the use of the length information will not cause an erroneous channel selection. For example, as shown in FIG. 4C, both the VM1 and VM2 signals go active simultaneously causing the message qualifier 48 to have a transition from the rest state 101 to the both channels active state 104. At time T2 when the VM1 signal goes inactive, another transition will occur from state 104 to state 106 as the VM2 signal is still active and under normal conditions would be the last to end. At time T3 when the noise pulse 52 causes the VM1 signal to go active again, a transition will occur in the frame qualifier state machine 48 from the channel 2 last to end state 106 to the channel 1 double pulse state 107. Similarly, if there had been a double pulse in the VM2 signal, a transition would have occurred from the channel 1 last to end state 105 to the channel 2 double pulse state 108. At time T5 when both of the VM1 and VM2 signals go inactive, a transition from the corresponding double pulse state 107 (or 108) to the rest state 101 will occur. Upon this transition an indication will be sent to the historical register 54 indicating that the first cable (or the second cable) was bad due to the double pulse.

The outputs from the message frame qualifier 48, indicating whether channel 1 or channel 2 is bad, are coupled to a historical register 54 which serves to avoid anomalies which would lead to the selection of the worse of the two cables due to a transient situation. Specifically, over a given period of time, one cable may be significantly poorer than the other. For example, for ten consecutive message frames one cable always had the longer frame thereby being consistently better. However, a single poor message may be received on the better cable which could cause receiver 10 to switch over to the historically bad cable. The historical register 54 contains a mechanism which, if the performance of one cable has been significantly better than that of the other one, will cause the receiver to remain connected to the better cable even though a few bad messages may be received on it.

Figure 7:
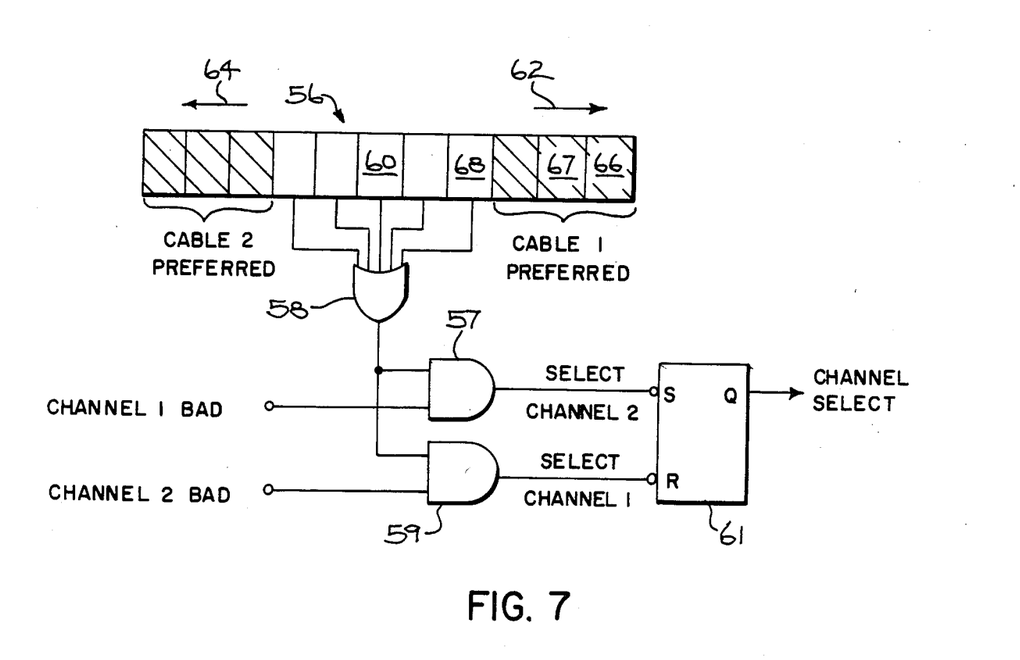
FIG. 7 is a schematic diagram of a part of the historical regiser of FIG. 3.

The historical register 54 is implemented on a programmed logic array similar to the implementation of the frame qualifier 48. For explanation purposes, the historical register 54 is schematically represented in FIG. 7 as an eleven stage shift register counter having parallel outputs from the middle five stages connected to a five input OR gate 58. Upon system initialization, the counter 56 is loaded with a high logic level count bit in its middle stage 60. The other stages contain a low logic level bit. Upon the receipt of a signal from the message qualifier 48 indicating that the second channel received a bad message frame, the counter 56 will shift the count bit to the right (direction 62) one stage. Similarly, for each indication from the message qualifier 48 that the first channel has carried a bad message the counter 56 will shift the count bit left one stage in direction indicated by the arrow 64. If neither channel is indicated as being bad, the count bit is held.

As long as the count bit remains in one of the middle five register stages which are connected to the OR gate 58, the indication of which channel is bad from the message qualifier is used to control the channel selection. The output of the OR gate 58 is connected to one input of each of two AND gates 57 and 59. The other input of the first AND gate 57 is connected to the bad channel 1 signal from the message frame qualifier 48 and the bad channel 2 signal from the qualifier is connected to the other input of the second AND 59. When the count bit in the shift register counter 56 is in one of the five central stages, historically neither of the two cables is consistently better than the other. The count bit in one of these stages produces a high output from the OR gate 58 which enables both of the AND gates 57 and 59. With the AND gates 57 and 59 enabled, they transmit the respective bad bus signals from the frame qualifier 48 to their outputs. For example, in this state of the shift register the counter 56, a high level channel 1 bad signal will be transmitted by the first AND gate 57 to produce a high select channel 2 signal at its output. At this time the channel 2 bad signal will be low indicating a good signal has been received on its cable, this low level will be transmitted as a low level by the second AND gate 59 which will not produce a select channel 1 signal at its output.

The select channel 2 signal from AND gate 57 is connected to the reset input of a flip-flop 61 which has the select channel 1 signal from AND gate 59 connected to its set input. The flip-flop 61 produces the channel select output of the historical register 54. A high level at the Q output indicates channel 1 has the better signal and should be coupled to MAC 42. A low Q output indicates that channel 2 should be selected.

However, if bad messages are consistently being received on one of the cables, the shift register counter 56 will be stepped so that the count bit resides in one of the three end register stages (indicated by the three shaded stages at both ends of the counter). As these end stages are not coupled to the OR gate 58, an occasional good message frame on this cable along with a bad message received on the other, historically good, cable will not cause a switch in the channel connection to the MAC 42. For example, if the shift register counter 56 has stepped the count bit into register stage 66 at the extreme right of the shift register, the second cable 8' has historically demonstrated a poor performance and the first cable 8 is to be the preferred communication link. If the receiver 10 indicates for the next message that a longer valid Manchester signal was produced by channel 2, the message qualifier 48 indicates that the first cable 8 is bad causing the shift register decrement one register to the left. However, because the count bit still remains within the cable 1 preferred region of the counter (i.e. within register stage 67), the signal from the first cable 8 continues to be connected to the MAC 42. However, if the next two message frames received indicate that the first cable is bad, the count bit will reside in register stage 68. This is one of the middle five stages thereby producing an enabling output from the OR gate 58. When the shift register count bit located in one of the shaded stages at the extreme ends of its count, a redundancy warning output will be sent from the historical register 54 which is used by the receiver 10 or additonal circuitry connected thereto to indicate a significant problem with one of the cables 8 or 8'.

In the situation where one of the cables 8 or 8' was temporarily shut down so as to place a count bit in one of the extreme end stages of the shift register counter 56 and then tha cable is repaired, the count of the shift register counter 56 might not change. This would especially be true where both cables 8 and 8' are now performing equally well so that neither one has a message frame length that was longer thn the other, such as indicated in FIG. 4A. In this situation even though both cables were equivalent in performance, the historical register 54 still indicates that one cable is significantly better than the other, as no incrementing or decrementing of the shift register counter 56 occurs. To overcome this, every twelve seconds, for example, timer 50 in FIG. 3 issues a output signal designated CREEP. This output signal is coupled to the historical register 54 which upon receiving each pulse of the CREEP signal causes the counter 56 to increment or decrement as is necessary to step its count bit one stage toward the central stage 60. Therefore, in the situation where a bad cable has been repaired and now has consistently equal performance to that of the historically good cable, every 12 seconds the counter bit will step one stage toward the center. After a maximum of five CREEP pulses the count bit will be positioned in the central stage 60. The count bit will remain in stage 60 until one channel is indicated as having received a bad message frame.

The remainder of the circuit in FIG. 3 consists of the multiplexer portion 70 of the arbitration and multiplexer circuit 40. The multiplexer 70 receives the data and clock signals from both of the demodulators 22 and 22' and switches the set of these signals from the selected channel to the MAC 42.

The channel select output from the historical register 54 in the arbitration logic section 43 is coupled to the data inputs of first and second D-type flip-flops 72 and 74 respectively. The clock inputs for the two arbitration flip-flops 72 and 74 are coupled to a different recovered clock signal output from the Manchester decoders 34 or 34' for the two channels 13 or 13'. Each clock signal from the two channels is also connected to an input of a different one of a pair of first and second NOR gates 76 and 78. The other input of the first NOR gate 76 is connected to the not Q output of the first flip-flop 72 which output is also connected to the set input of the second flip-flop 76. The Q output of the second flip-flop 74 is connected to the other input of the second NOR gate 78 and to the reset input of the first flip-flop 72. The set input of the first flip-flop 72 and the reset input of the second flip-flop 74 are coupled to a positive voltage source through pull up resistors. The outputs of the first and second NOR gates 76 and 78 are coupled to separate inputs of a third NOR gate 80 which produces the receiver clock output signal. This clock output signal is coupled to MAC 40.

One input of a first NAND gate 82 is connected to the valid Manchester signal for the first cable (VM1). The other input for the first NAND gate 82 is connected to the Q output of the first flip-flop 72. A second NAND gate 84 has one input connected to the valid Manchester signal for the second cable (VM2) and has another input connected to the not Q output of the second flip flop 74. The outputs of the first and second NAND gates 82 and 84 are coupled to separate inputs of a first AND gate 86. The output of the first AND gate 86 represents the receiver valid signal output from the multiplexer 70.

The outputs of the first and second NAND gates 82 and 84 are also connected to respective inputs of the first and second OR gates 88 and 90. The other inputs of the first and second OR gates 88 and 90 are connected to the data outputs from the Manchester encoder/decoders 34 and 34' in the first and second channels 13 and 13' respectively. The outputs of the first and second OR gates 88 and 90 are connected to separate inputs of a second AND gate 92 whose output represents the receiver's data output signal. The three output signals from the multiplexer 70 (receiver clock, receiver valid and receiver data) are connected to the MAC 42 as shown in FIG. 1.

Figure 8:
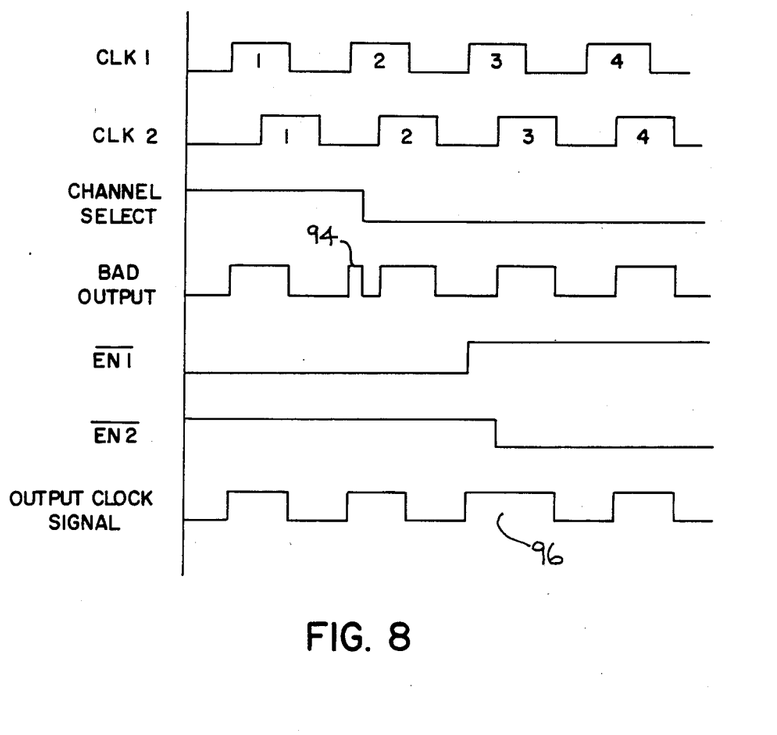
FIG. 8 is a timing diagram of the multiplexer operation for the FIG. 3 system.

The channel select signal from the historical register 54 cannot be used directly to control the multiplex switching of the various signals from the demodulators 22 because of a possible skew between the two message frames. As shown in FIG. 8, the recovered clock signals CLK1 and CLK2 for each channel 13 and 13' may be slightly shifted in time with respect to one another as a result of different lengths of the two cables 8 and 8'. The channel select signal represents a transition from receiving on the first channel 13 to receiving on the second channel 13'. If this signal is used to simply switch between the clock signals from the two Manchester circuits 34 and 34', a bad output clock signal could result as is shown in FIG. 8. The bad output signal contains a short pulse 94 which will produce erroneous decoding of the digital information by the media access controller 42. This short clock pulse 94 results from the output clock signal being formed by part of the second CLK1 pulse and the entire second pulse of the CLK2 signal.

The present multiplexer circuit 70 includes logic which upon the receipt of a channel select transition, uses the leading edge of the next clock pulse from the currently chosen cable to commence an output clock pulse. The transition to the other cable's clock signal is not made until the receipt of the next leading edge of that cable's clock signal. Although this may produce a long clock pulse 96 in the output clock signal, the digital signal processing logic in the media access controller 42 is tolerant of longer clock pulses so that no confusion occurs in the decoding process.

With reference to FIGS. 3 and 8, assuming that the cable connected to channel 1 has been initially selected by the receiver, the first flip-flop 72 has the not Q output (EN1) at the low level so that NOR gate 76 will transmit the inverted version of the channel 1 clock pulses (CLK1) to the third NOR gate 80. The low level on the not Q output from the first flip-flop 72 sets the second flip-flop 74 so that its Q output (EN2) is a high state disabling the second NOR gate 78 from transmitting the second channel clock signal (CLK2). Therefore, at this time, the receiver clock output from the third NOR gate 80 and, therefore, the multiplexer 70 will be the first channel clock signal (CLK1).

When the channel select signal goes low indicating that channel 2 is to be connected to the receiver, that low level is applied to the data input of each of the flip-flops 72 and 74. On the rising edge of the next clock signal applied to each of the flip-flops a change in its output state will occur. Specifically, the first flip-flop 72 will change output states on the rising edge of the third pulse in the CLK1 clock signal. This transition will produce a high not Q signal (EN1) which will cause a constant low level output from the first NOR gate 76 regardless of the level of the CLK1 signal. Therefore both of inputs to the third NOR gate 80 are at a low state producing a high level output clock pulse 96.

Upon the rising edge of the third pulse in the CLK2 clock signal, the second flip-flop 74 will change states producing a low level Q output signal (EN2). When the Q output is coupled to the second NOR gate 78 that gate produces an output signal which is the inverted version of the CLK2 signal. In this state the third NOR gate 80 will transmit an inverted version of the output signal from the NOR gate 78, i.e. a replica of the second channel clock signal (CLK2). Upon the occurrence of the falling edge of the third clock pulse in the CLK2 signal, the long clock pulse 96 also has a falling edge. From that point on in time, the receiver clock output of the multiplexer 70 will be the channel 2 clock signal until a change occurs in the channel select signal. This avoids a double pulse being generated in the output clock signal.

We claim:

1. In a receiver of a station for a redundant communication network having two communication media connected to each of a plurality of stations wherein each transmission of information on the network consists of identical message frames being sent simultaneously over both media, a system for choosing one of the media from which to receive the information comprising:
   means for determining for a given transmission whether the message frame received on one medium was longer than the message frame received on the other medium;
   means responsive to the determining means for selecting one of said media based on a given criteria, if for a given transmission either message frames were received on both media or a message frame was received on only one medium for at least a predetermined interval; and
   a multiplexer for connecting the selected medium to the output of the system.

2. The system as in claim 1 wherein the means for determining includes a first counter having a predetermined value at the beginning of the receipt of each message frame, said counter being decremented while a message frame is being received on only one medium and being incremented while a message is being received on only the other medium.

3. The system as in claim 2 wherein said determining means further includes means for indicating at the end of the receipt of a given transmission whether the contents of the counter is above or below the predetermined value and selecting one or the other medium based upon the relationship of the contents to the predetermined value.

4. The system as in claim 3 wherein the determining means further includes means for indicating that a message frame received on only one medium lasted for at least a predetermined period of time.

5. The system as in claim 1 wherein said determining means further includes means for indicating, when a message frame is received on only one of the two media, that the message frame lasted for at least the predetermined interval of time.

6. The system as in claim 1 wherein the means for selecting one of said communication media comprises means for selecting the medium that carried the longer of the two frames when message frames were received on both of the media, or if a message frame was received on only one medium selecting that medium when its message frame lasted for at least the predetermined interval of time.

7. The system as in claim 6 wherein said means for selecting one of said media further comprises means for determining whether the longer of the two frames indicated by said determining means consisted of more than one frame pulse, in which case the communication medium on which the other frame was transmitted is selected.

8. The system as in claim 1 further comprising means for indicating whether the frame indicated by the determining means as being the longer frame actually comprised more than one frame pulse.

9. The system as in claim 1 further comprising means for indicating when one medium has been selected a given number of times more often than the other medium.

10. The system as in claim 9 wherein said indicating means includes a multi-stage counter.

11. The system as in claim 1 further comprising means for inhibiting said means for selecting from causing said multiplexer to connect one medium to the receiver output circuit when another medium has been selected a given number of times more often than the one medium.

12. The system as in claim 1 wherein said multiplexer comprises:
means for receiving the clock information from the received message frame carried by each medium; and
means in response to the selection of a different medium than that which is presently connected to the receiver for disconnecting the presently connected medium from the receiver upon receipt of a clock pulse from that medium and then connecting another medium to the receiver upon receipt of the next clock pulse on the other medium.

13. In a receiver for a station of a redundant communication network having two communication media connected to each of a plurality of stations on the network wherein for each transmission on the network identical message frames are sent simultaneously over both media, a system for choosing one of the media from which to receive the information comprising:
means for determining for a given transmission whether a message frame was received on both media and if so which media carried the longer message frame;
means for indicating, when a message frame is received on only one of said media, that said frame lasted at least for a predetermined period of time; and
means responsive to the determining means and to the indicating means for connecting the system output to either (1) the medium that carried the longer message frame when messages were received on both media, or (2) the medium that carried the only message frame received if that frame lasted at least the predetermined period of time.

14. The system as in claim 13 wherein said determining means includes a counter whose contents indicate the relative lengths of the message frames received on the two media for a given transmission.

15. The system as in claim 13 further comprising: means for sensing when the message frame indicated as being the longer one consists of more than one frame pulse; and
means for inhibiting the connection of the system output to the medium that carried a message frame consisting of more than one frame pulse.

16. The system as in claim 13 further comprising means for inhibiting the connection of the system output to the medium that carried the longer message frame, if previously that medium had not consistently carried the longer message frame.

17. A method for receiving information wherein each transmission of information is in the form of message frames sent in duplicate over two communication media comprising the steps of:
(a) determining which medium carried the longer message frame for a given transmission when message frames are received on both media;
(b) indicating that a message frame lasted for at least a predetermined time period when a message frame for a given transmission is received on only one medium; and
(c) connecting a message frame processor to the given medium that carried either the longer message frame when message frames were received on both media for a given transmission, or the only message frame that was received if that frame lasted for said predetermined time period.

18. The method as in claim 17 further comprising the steps of:
sensing if a message frame consisted of more than one frame pulse; and
inhibiting the connection of the message frame processor to the medium that carried the message frame which consisted of more than one frame pulse.

19. The method as in claim 17 further comprising the steps of:
sensing that a particular medium has consistently carried the longer message frames; and
inhibiting the connection of a medium other than the particular medium to the message frame processor until the other medium has been consistently sensed to be substantially as good as the particular medium.

20. The method as in claim 17 further comprising:
inhibiting the connection of a medium to the message frame processor which consistently has not carried a longer message frame for a given number of message frame transmissions.

21. The method as in claim 17 wherein, if other than the given medium is connected to the message frame processor, said connecting step comprises the steps of:
(a) receiving clock signals sent over both media;
(b) disconnecting the presently connected medium from the message frame processor upon the receipt of a clock pulse on that medium; and
(c) then connecting the given medium to the message frame processor upon the receipt of a clock pulse on the given medium.

* * * * *